(12) United States Patent
Zhu et al.

(10) Patent No.: US 11,938,678 B2
(45) Date of Patent: Mar. 26, 2024

(54) ADHESION BLOCKING ELEMENT, THREE-DIMENSIONAL PRINTING DEVICE, AND THREE-DIMENSIONAL PRINTING METHOD

(71) Applicants: NINGBO SEZEN TECHNOLOGY CO., LTD., Zhejiang (CN); BEIJING QINGFENG SHIDAI TECHNOLOGY CO., LTD., Beijing (CN)

(72) Inventors: Guang Zhu, Ningbo (CN); Zhifeng Yao, Beijing (CN); Fang Li, Beijing (CN); Yi-Ho Lin, Beijing (CN); Yanhui Guo, Beijing (CN); Hu Wang, Beijing (CN)

(73) Assignee: LUXCREO (BEIJING) INC., Beijing (CN)

( * ) Notice: Subject to any disclaimer, the term of this patent is extended or adjusted under 35 U.S.C. 154(b) by 0 days.

(21) Appl. No.: 16/761,682

(22) PCT Filed: May 5, 2019

(86) PCT No.: PCT/CN2019/085569
§ 371 (c)(1),
(2) Date: May 5, 2020

(87) PCT Pub. No.: WO2019/214552
PCT Pub. Date: Nov. 14, 2019

(65) Prior Publication Data
US 2021/0178682 A1    Jun. 17, 2021

(30) Foreign Application Priority Data

May 5, 2018    (CN) .......................... 201810422439.1
Jun. 6, 2018   (CN) .......................... 201810571564.9

(Continued)

(51) Int. Cl.
B29C 64/255    (2017.01)
B29C 64/124    (2017.01)
(Continued)

(52) U.S. Cl.
CPC .......... B29C 64/255 (2017.08); B29C 64/124 (2017.08); B33Y 10/00 (2014.12); B33Y 30/00 (2014.12)

(58) Field of Classification Search
CPC ... B29C 64/255; B29C 64/124; B29C 64/129; B29C 64/135; B33Y 10/00; B33Y 30/00
See application file for complete search history.

(56) References Cited

U.S. PATENT DOCUMENTS 5,171,490 A * 12/1992  Fudim ................... B33Y 30/00
                                                 264/401
2002/0153640 A1  10/2002  John
(Continued)

FOREIGN PATENT DOCUMENTS

CN    204451224 U    7/2015
CN    105452958 A    3/2016
(Continued)

OTHER PUBLICATIONS

Chinese National Intellectual Property Administration, Office Action, Chinese Application No. 201810571564.9, dated May 28, 2019, 6 pages.

(Continued)

*Primary Examiner* — Thu Khanh T. Nguyen
*Assistant Examiner* — Jamel M Nelson
(74) *Attorney, Agent, or Firm* — METIS IP LLC

(57) ABSTRACT

Disclosed herein are an adhesion blocking element, a three-dimensional printing device and a three-dimensional printing method. The adhesion blocking element comprises: one light-transmittable main body comprising a first surface and (Continued)

a second surface which are disposed opposite to each other, and side faces connecting the first surface and the second surface; and a plurality of microstructures arranged on the main body, wherein each microstructure has one cavity formed in the main body and one first open face which is arranged on the first surface of the main body and communicated to the cavity. The present invention decreases the adhesion between the adhesion blocking element and the cured layer by improving the structure of the adhesion blocking element itself, and eliminates the negative pressure adsorption between the cured layer and the adhesion blocking element, so that it is easier to peel the adhesion blocking element off from the cured layer. Meanwhile, the service life of the adhesion blocking element is prolonged by enhancing the local elastic deformability of the adhesion blocking element. In addition, the release layer adopted in the present invention is liquid, and the formed three-dimensional construct is solid, which makes the three-dimensional construct and the release layer more easily separated, thereby improving the speed of three-dimensional manufacturing.

9 Claims, 12 Drawing Sheets

(30)  Foreign Application Priority Data

Aug. 28, 2018  (CN) .................. 201810984776.X
Aug. 28, 2018  (CN) .................. 201810984844.2
Aug. 28, 2018  (CN) .................. 201810984845.7

(51) Int. Cl.
  B33Y 10/00   (2015.01)
  B33Y 30/00   (2015.01)

(56)  References Cited

U.S. PATENT DOCUMENTS

2009/0309267 A1*  12/2009  Boot ................ B29C 64/135
                                                  425/117
2014/0191442 A1*   7/2014  Elsey ............... B29C 64/223
                                                  264/401
2015/0102532 A1    4/2015  Desimone et al.
2016/0279895 A1*   9/2016  Marjanovic ........... B32B 17/06
2016/0288413 A1   10/2016  Yakubov et al.
2017/0192412 A1    7/2017  Wu et al.
2017/0210077 A1    7/2017  Ermoshkin et al.

FOREIGN PATENT DOCUMENTS

| CN | 105799168 A | 7/2016 | |
| CN | 106079495 A | 11/2016 | |
| CN | 106466918 A | 3/2017 | |
| CN | 206308307 | 7/2017 | |
| CN | 206308307 U | 7/2017 | |
| CN | 107031036 | 8/2017 | |
| CN | 206765363 U | 12/2017 | |
| CN | 207128364 U | 3/2018 | |
| CN | 108297398 | 7/2018 | |
| CN | 108705771 | 10/2018 | |
| CN | 108705771 A | 10/2018 | |
| CN | 108748980 A | 11/2018 | |
| CN | 208748980 | 11/2018 | |
| CN | 108943697 | 12/2018 | |
| CN | 109130172 | 1/2019 | |
| EP | 2956821 A2 * | 12/2015 | ............. G03F 7/027 |
| EP | 3248781 | 11/2017 | |
| JP | 2018051996 A | 4/2018 | |
| WO | WO/2017/056124 | 4/2017 | |
| WO | 2017074387 A1 | 5/2017 | |
| WO | WO/2017/102700 | 6/2017 | |

OTHER PUBLICATIONS

Chinese National Intellectual Property Administration, Office Action, Chinese Application No. 201810422439.1, dated May 28, 2019, 6 pages.
Chinese National Intellectual Property Administration, Office Action, Chinese Application No. 201810984776.X, dated May 28, 2019, 6 pages.
Chinese National Intellectual Property Administration, Office Action, Chinese Application No. 201810984844.2, dated May 20, 2019, 5 pages.
Chinese National Intellectual Property Administration, Office Action, Chinese Application No. 201810984845.7, dated May 17, 2019, 6 pages (with concise explanation of relevance).
The Extended European Search Report in European Application No. 19799674.7 dated May 10, 2021, 10 pages.
PCT International Search Report and Written Opinion, PCT/CN2019/085569, dated Jul. 15, 2019, 14 pages.
Notice of Rejection in Japanese Application No. 2020-563639 dated Dec. 20, 2021, 9 pages.
The Second Office Action in Chinese Application No. 202210759703.7 dated Dec. 13, 2023, 17 pages.

* cited by examiner

ADHESION BLOCKING ELEMENT, THREE-DIMENSIONAL PRINTING DEVICE, AND THREE-DIMENSIONAL PRINTING METHOD

TECHNICAL FIELD

The present invention relates to the technical field of photocuring three-dimensional printing, and in particular to an anti-sticking element, a three-dimensional printing device and a three-dimensional printing method.

BACKGROUND

Photocuring three-dimensional printing technology refers to a technology in which the photocurable resin is used as a raw material, the resin area to be cured in a two-dimensional plane is irradiated by a computer-controlled light source, and cured to obtain a cured layer having the same cross-sectional structure as certain cross-section of the three-dimensional object, and the cured layers are stacked layer-by-layer, to obtain the final desired three-dimensional object.

At present, a transparent fluorine-containing polymer film is usually provided at the bottom of a cartridge for holding a photocurable resin. When the photocurable resin is cured to form a cured layer, the cured layer comes into contact with the film. Then, the cured layer is moved in a direction away from the film so that there are gaps between the cured layer and the film, wherein the photocurable resin is filled into the gap. Then, the photocurable resin between the cured layer and the film can be cured to form a new cured layer.

During the movement of the cured layer in a direction away from the film, the adhesion between the cured layer and the film will cause damage to the contact surfaces of the film and the cured layer and also to the cured layer, resulting in decrease in the mechanical strength of the three-dimensional object obtained by curing. A solution known in the art is to drive, whenever a cured layer is formed, the cartridge to slightly turn over, in order to tear the film off from the cured layer. In this way, the adhesion between the film and the cured layer during the separation of the film from the cured layer can be reduced, so as to reduce the damage to the film and the cured layer. However, this solution requires the arrangement of a device for driving the pallet to turn over. This increases the equipment cost of the three-dimensional printing device, and the time consumption for printing is prolonged since it is necessary to turn the cartridge over during the separation of each cured layer from the film.

Furthermore, during the movement of the cured layer in a direction away from the film, in order to quickly fill the photocurable resin into the gaps between the cured layer and the film, it is necessary to increase the flow rate of the photocurable resin. At present, this is accomplished generally by heating the photocurable resin or vibrating the cartridge. However, since heating the photocurable resin requires the arrangement of a heating apparatus and vibrating the cartridge requires the arrangement of a vibrating apparatus, both will increase the equipment cost of the three-dimensional printing device.

In addition, the technical principle of photocuring three-dimensional fabrication (printing) is as follows: a three-dimensional model is divided into layers in one direction to acquire contour information or image information of each layer, then the data information of each layer is realized by a light source, and a photoinitiator (photosensitizer) is formed by a polymer monomer and a prepolymer and then irradiated by UV light for polymerization reaction, in order to complete the curing of each layer. This process is repeated to finally form a three-dimensional solid model. Since a release step of separating a three-dimensional construct under construction from the bottom surface of a region where curing occurs is conducted, followed by standing for a few seconds to make the liquid level becomes stable, it often takes more than ten seconds to print a layer and thus the efficiency is quite low.

A method used in the prior art is to peel, by a mechanical step, a three-dimensional construct under construction off from the bottom surface of a region where curing occurs. Such a mechanical step not only requires high precision for the mechanical structure, but also increases the overall time consumption for fabrication. The patent with Application No. 201480008529.6, entitled "method and apparatus for three-dimensional fabrication with feed through carrier", filed on Feb. 10, 2014, discloses that the bottom surface of a region of a three-dimensional construct where curing occurs plays a role of isolating from curing by a semipermeable member and a polymer liquid film release layer, and a new cured layer is separated from the bottom surface of the region where curing occurs so that it is unnecessary to separate them by a mechanical step. In this way, the efficiency of fabrication is improved. However, to realize the technical solution described above, it is required to hold, on the bottom surface of the region where curing occurs, the inhibitor fluid which inhibits the curing of the curable material, and always maintain a curable material liquid film in a certain thickness. In actual operations, variables such as the flow rate of the inhibitor supplied, the permeability of the semipermeable member to the inhibitor and the thickness of the curable material liquid film will have an influence on the curing and further on the final modeling effect of the three-dimensional construct. Due to the large number of variables in the actual application of the device, there is difficulty in the production process.

SUMMARY

A technical problem to be solved in the present invention is to provide an adhesion blocking element, a three-dimensional printing device and a three-dimensional printing method. The present invention decreases the adhesion between the adhesion blocking element and the cured layer by improving the structure of the adhesion blocking element itself, and eliminates the negative pressure adsorption between the cured layer and the adhesion blocking element, so that it is easier to peel the adhesion blocking element off from the cured layer, and the time consumption for filling the forming material into the gaps between the cured layer and the adhesion blocking element is reduced by improving the structure of the adhesion blocking element itself. Meanwhile, the service life of the adhesion blocking element is prolonged by enhancing the local elastic deformability of the adhesion blocking element.

To solve the technical problem described above, the present invention provides an adhesion blocking element, comprising: one light-transmittable main body comprising a first surface and a second surface which are disposed opposite to each other, and side faces connecting the first surface and the second surface; and a plurality of microstructures arranged on the main body, wherein each microstructure has one cavity formed in the main body and one first open face which is arranged on the first surface of the main body and communicated to the cavity.

Preferably, the cavities in at least two microstructures are communicated with each other.

Preferably, the cavities in all microstructures are communicated with each other.

Preferably, the cavity in at least one microstructure has a second open face arranged on the second surface of the main body.

Preferably, the cavities in all microstructures each have a second open face arranged on the second surface of the main body.

Preferably, the cavity in at least one microstructure has a third open face arranged on at least one side face of the main body.

Preferably, the area of the first open face of each microstructure is 0.0001-100000 µm².

Preferably, the area of the first open face of each microstructure is 0.01-100 µm².

Preferably, the rate of a sum of the areas of the first open faces in all microstructures to the area of the first surface of the main body is 0.01-0.99.

Preferably, the rate of a sum of the areas of the first open faces in all microstructures to the area of the first surface of the main body is 0.05-0.9.

Preferably, the rate of a sum of the areas of the first open faces in all microstructures to the area of the first surface of the main body is 0.1-0.4.

Preferably, the distribution density of the first open faces of the microstructures on the first surface of the main body is $10^4$-$10^{11}$/mm².

Preferably, the rate of a sum of the volumes of the cavities in all microstructures to the volume of the main body is 0.01-0.99.

Preferably, the rate of a sum of the volumes of the cavities in all microstructures to the volume of the main body is 0.1-0.95.

Preferably, the rate of a sum of the volumes of the cavities in all microstructures to the volume of the main body is 0.6-0.9.

Preferably, an average value of the spacings between the first open faces in any two adjacent microstructures is less than 450 nm.

Preferably, the main body has a flexural modulus of 10-500 Mpa.

Preferably, the adhesion blocking element is made of one or more of polytrifluorochloroethylene, polytetrafluoroethylene, polyvinylidene fluoride, poly(vinylfluoride), polytrichloroethylene, perfluoroalkyl polyether, hexafluoropropylene, fluorinated poly(vinyl chloride), poly(4-methyl-1-pentene) and polydimethylsiloxane.

Preferably, the adhesion blocking element is made of one or more of polytetrafluoroethylene, poly(4-methyl-1-pentene) and polydimethylsiloxane.

Preferably, the adhesion blocking element is made of one or more of Parylene, polyperfluorinated ethylene propylene, ethylene-chlorotrifluoroethylene copolymer, polyvinylidene fluoride, ethylene-tetrafluoroethylene copolymer, tetrafluoroethylene-vinylidene fluoride copolymer, chlorotrifluoroethylene-vinylidene fluoride copolymer, o-phenylphenol, polyphenyl ether, polyterephthalic acid and polystyrene, wherein Parylene comprises Parylene C, Parylene N, Parylene D, Parylene HT and Parylene AF.

To solve the technical problem described above, the present invention further provides a three-dimensional printing device, comprising: one cartridge used for holding a forming material in a liquid form, wherein the bottom surface of the cartridge is light-transmittable; one adhesion blocking element as described above, wherein the first surface of the adhesion blocking element is a surface contacted with the forming material in the cartridge and the second surface of the adhesion blocking element is placed on the bottom surface of the cartridge; one light source, used for irradiating the forming material which is in contact with the first surface of the adhesion blocking element to cure the irradiated forming material to form a cured layer; and one carrier for driving the cured layer to move.

Preferably, the forming material and the adhesion blocking element do not infiltrate into each other.

Preferably, the spacing between the first open faces in any two adjacent microstructures is less than the wavelength of light emitted by the light source.

To solve the technical problem described above, the present invention further provides a three-dimensional printing method, comprising:
  a) placing the adhesion blocking element on the bottom surface of the cartridge;
  b) pouring, into the cartridge, the forming material which is in the liquid form;
  c) moving the carrier to a position at a certain distance from the first surface of the adhesion blocking element, and irradiating, by the light source, the forming material which is in contact with the first surface of the adhesion blocking element so that the irradiated forming material is cured to form a cured layer which is attached to the bottom of the carrier;
  d) driving, by the carrier, the cured layer to move in a direction away from the light source, wherein during the movement of the cured layer, a portion of the first surface of the adhesion blocking element which is in contact with the cured layer, is pulled up to elastically deform, and the cured layer is separated from the first surface of the adhesion blocking element after the cured layer has been moved a certain distance;
  e) irradiating, by the light source, the forming material which is in contact with the first surface of the adhesion blocking element, so that the cured layer formed by curing the irradiated forming material is attached to a previously formed cured layer to form a unibody structure; and
  f) repeating the above steps c) to e) until the printing of the three-dimensional object is completed.

With the above structure and method, the present invention has the following advantages compared to the prior art:
  1) Due to the presence of the first open surfaces, the contact area between the adhesion blocking element and the cured layer is reduced and the adhesion between the adhesion blocking element and the cured layer is decreased.
  2) Due to the arrangement of a great number of microstructures, the contact angle between the forming material and the first surface of the adhesion blocking element is increased, and thus the adhesion between the adhesion blocking element and the cured layer is further decreased. The contact angle between the forming material and the first surface of the adhesion blocking element is calculated by the following formula:

$$\cos \theta' = -\varphi(\cos \theta + 1) - 1$$

where, $\varphi$ is the rate of a sum of the areas of the first open faces of all microstructures to the area of the first surface of the main body, $\theta'$ is the contact angle between the forming material and the first surface of the adhesion blocking element having a plurality of first open faces, and $\theta$ is the contact angle between the forming material and the first surface of the adhesion blocking element having no first open face.

3) There may be air in the cavities of the microstructures. When there is air in the cavities, the negative pressure adsorption between the cured layer and the adhesion blocking element can be eliminated, thereby facilitating the peeling of the adhesion blocking element from the cured layer.

4) Due to the arrangement of a great number of microstructures, the adhesion blocking element has high local deformability. In other words, when the adhesion blocking element deforms locally, other portions of the adhesion blocking element are less influenced by the local deformation. Such local deformability can implement quick restoration of the deformed portion of the adhesion blocking element after departing from the cured layer. This restoration process can draw the forming material towards the deformed portion of the adhesion blocking element. Thus, the time consumption for filling the forming material into the gaps between the cured layer and the adhesion blocking element is reduced, thereby reducing the time consumption for three-dimensional printing.

In addition, in view of the present situation in the prior art, a technical problem to be solved in the present invention is to provide a photocuring three-dimensional manufacturing device, which enables a three-dimensional construct to be quickly released during the curing process and realizes stable three-dimensional fabrication with high efficiency.

To solve the technical problem described above, the following technical solution is employed in the present invention. The present invention provides a photocuring three-dimensional manufacturing device, comprising:

(a) a carrier, used for carrying and moving a three-dimensional construct;
(b) a construction platform which is provided with a cartridge for holding a curable material, wherein the curable material is in a liquid form;
(c) a release layer arranged at the bottom of the cartridge, wherein the release layer is in contact with the curable material, is in a liquid form as a whole and immiscible with the curable material, and has a density greater than that of the curable material; and
(d) a light source, used for irradiating the construction platform and providing UV light in a range of wavelength that can be used to cure the curable material.

Further, a securing member is arranged between the release layer and the bottom of the cartridge, to secure the release layer.

Further, the securing member internally has a cavity structure communicated with the outside, and the release layer is secured in the cavity of the securing member.

Further, the securing member is gel or nanofiber.

Further, the gel has a three-dimensional network structure.

Further, the release layer is water or a light-transmittable aqueous solution.

Further, the light-transmittable aqueous solution is an inorganic salt solution.

Further, the inorganic salt solution is any one of soluble alkali metal salt solution, ammonium salt solution, nitrate solution, perchlorate solution, permanganate solution, sulfate solution, selenate solution, chloride solution, bromide solution and iodide solution.

Further, the soluble alkali metal salt solution, ammonium salt solution, nitrate solution, perchlorate solution, permanganate solution, sulfate solution, selenate solution, chloride solution, bromide solution and iodide solution are all saturated solution.

Further, the light-transmittable aqueous solution is water-soluble organic salt weighting agent solution.

Further, the water-soluble organic salt weighting agent solution is any one of organic acid alkali metal salt solution, organic acid ammonium salt solution, organic acid tertiary ammonium salt solution and organic acid quaternary ammonium salt solution.

Further, inside the release layer, there is a solid securing member for securing the release layer.

Further, the securing member is flaky or platy or blocky.

Further, the securing member has one upper surface that is flush with the upper surface of the release layer.

Further, the securing member has a plurality of cavities, the upper surface of the securing member has a plurality of open faces communicated with the cavities, and the release layer enters the cavities to form a solid-liquid interface on the upper surface of the securing member.

Further, the securing member is immersed in the release layer, the securing member has one upper surface in parallel with the release layer, and the distance from the upper surface of the securing member to the upper surface of the release layer is greater than 0 and less than ½ of the depth of the release layer.

Further, the thickness of the securing member is less than ¼ of the depth of the release layer.

Further, the outer surface of the securing member is a rough surface.

Further, a plurality of channels provided for the passage of the release layer, are alternatively arranged in the securing member, and both ends of each of the channels run to the corresponding upper and lower surfaces of the securing member.

Further, the securing member is a sphere or cone or cylinder, and there are at least two securing members.

Further, the highest point of the securing member is flush with the upper surface of the release layer to form a solid-liquid interface.

Further, the securing member is immersed in the release layer and arranged at the bottom of the cartridge.

Further, the securing member is formed by polymerization of any one of, or copolymerization of more of, polytrifluorochloroethylene, polytetrafluoroethylene, polyvinylidene fluoride, poly(vinylfluoride), polytrichloroethylene, perfluoroalkyl polyether, hexafluoropropylene and fluorinated poly(vinyl chloride).

Compared with the prior art, the present invention has following advantages: a release layer is arranged between the bottom of the cartridge and the curable material, and the release layer can be maintained between the bottom of the cartridge and the curable material since the release layer has a density greater than that of the curable material and the release layer is immiscible with the curable material; the curable material in the cartridge in contact with the carrier is irradiated by the light source, and after a certain period of time, the curable material on the release layer irradiated by the light source is cured to form a part of the three-dimensional construct, then the irradiation is stopped and the carrier is controlled by a driving device to move a certain distance in a direction away from the light source; in this case, since the release layer is in the liquid form and the curable material which is cured by light is formed as the three-dimensional construct in the solid state, the contact surface between the three-dimensional construct and the release layer is in solid-liquid contact, in this way, the adhesion between the three-dimensional construct and the release layer is decreased, thus it is convenient for the quick separation of the three-dimensional construct from the release layer and also for the movement of the three-dimensional construct together with the carrier, and the efficiency of three-dimensional fabrication is improved; moreover, the release layer, as a stable separation medium, will have no influence on the forming effect of the three-dimensional construct, and the stability of three-dimensional fabrication is ensured.

DETAILED DESCRIPTION OF THE PRESENT INVENTION

Figure 1:
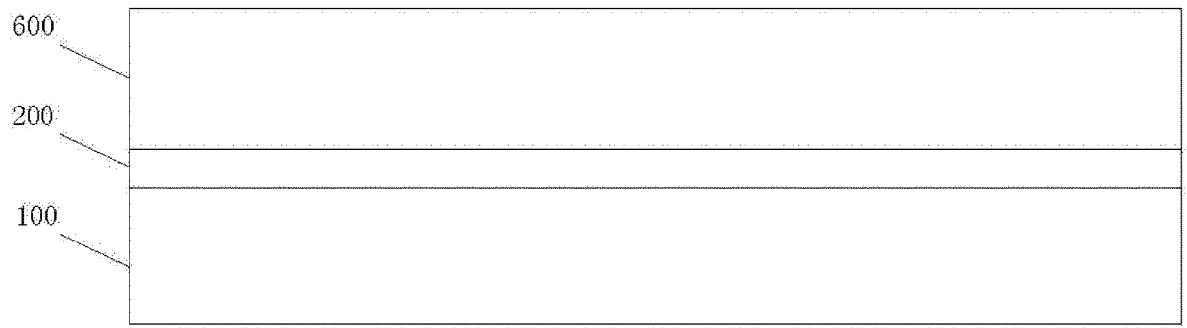
FIG. 1 is a combined view of a cured layer, an adhesion blocking element and a cartridge.
Figure 2:
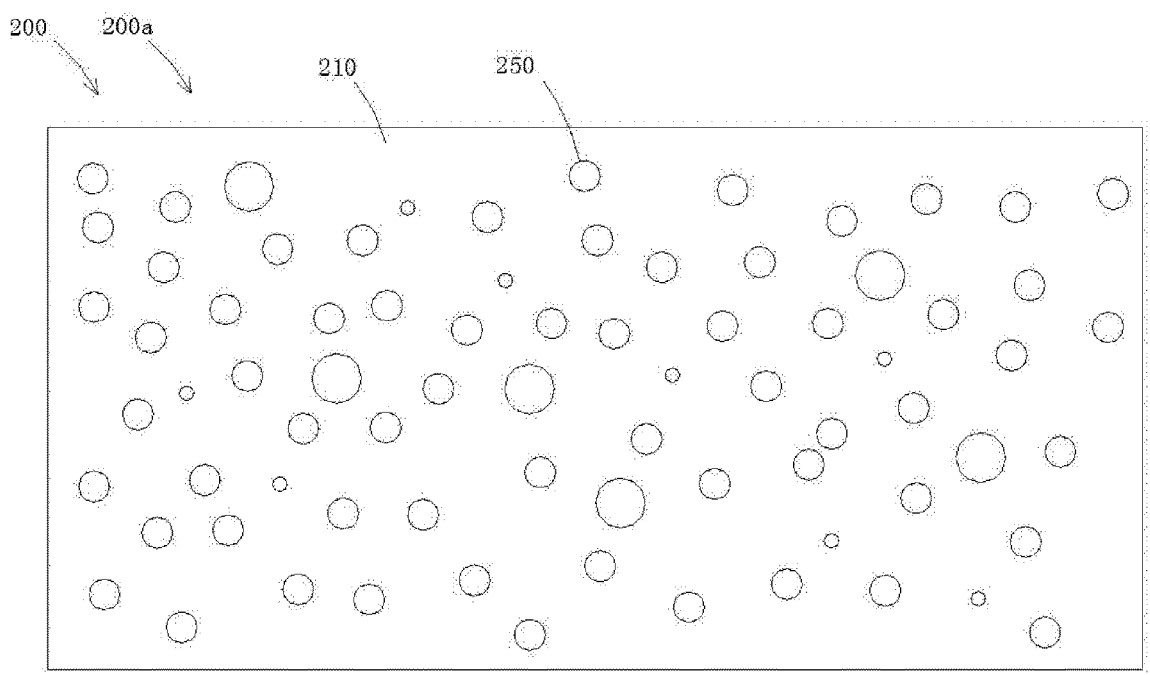
FIG. 2 is a structural diagram of an adhesion blocking element.

The present invention will be further described in detail with reference to the accompanying drawings in combination with specific implementations.

The adhesion blocking element 200 in this embodiment comprises a light-transmittable main body 200a and a plurality of microstructures arranged on the main body 200a.

Referring to FIGS. 2-6, the main body 200a takes the form of a film. The main body 200a comprises a first surface 210 and a second surface 220 which are disposed opposite to each other, and side faces 230 connecting the first surface and the second surface. There are four side faces 230. The first surface 210, the second surface 220 and the four side faces 230 form a rectangle.

Figure 3:
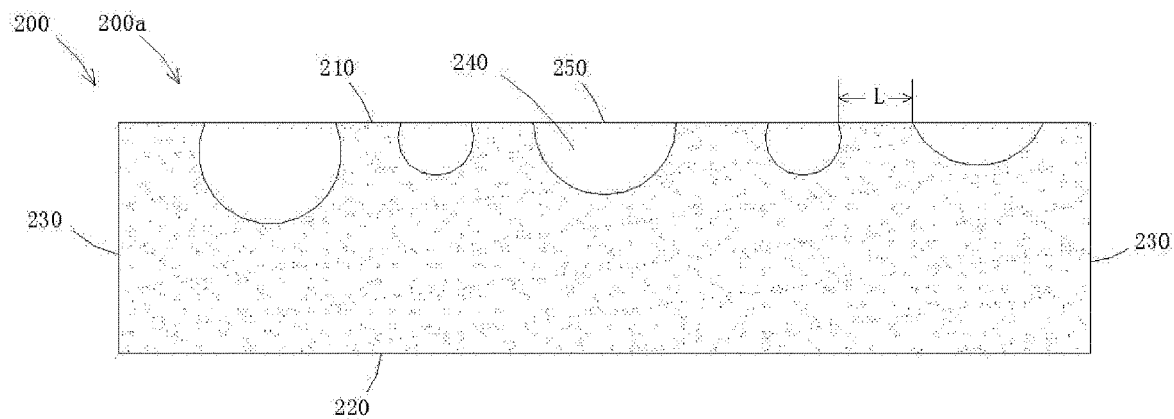
FIG. 3 is a sectional view of a first adhesion blocking element.

The microstructures may be in various forms. Referring to FIG. 3, in this case, each microstructure has one cavity 240 formed in the main body 200a and one first open face 250 which is arranged on the first surface 210 of the main body 200a and communicated to the cavity 240. The cavity 240 in each microstructure may be the same or different in shape. The cavity 240 in each microstructure may be the same or different in volume. The first open face 250 in each microstructure may be the same or different in area. The first open face 250 in each microstructure may be in circular, square, polygonal or irregular shape.

Figure 4:
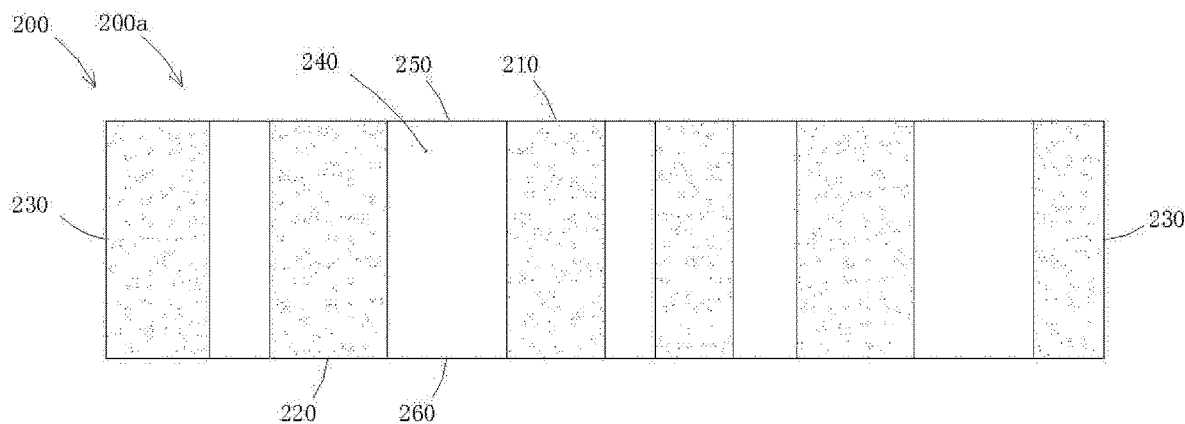
FIG. 4 is a sectional view of a second adhesion blocking element.

Referring to FIG. 4, in this case, each microstructure has one cavity 240 formed in the main body 200a, one first open face 250 which is arranged on the first surface 210 of the main body 200a and communicated to the cavity 240, and one second open face 260 which is arranged on the second surface 220 of the main body 200a and communicated to the cavity 240. The second open face 260 in each microstructure may be the same or different in area. The second open face 260 in each microstructure may be in circular, square, polygonal or irregular shape.

Figure 5:
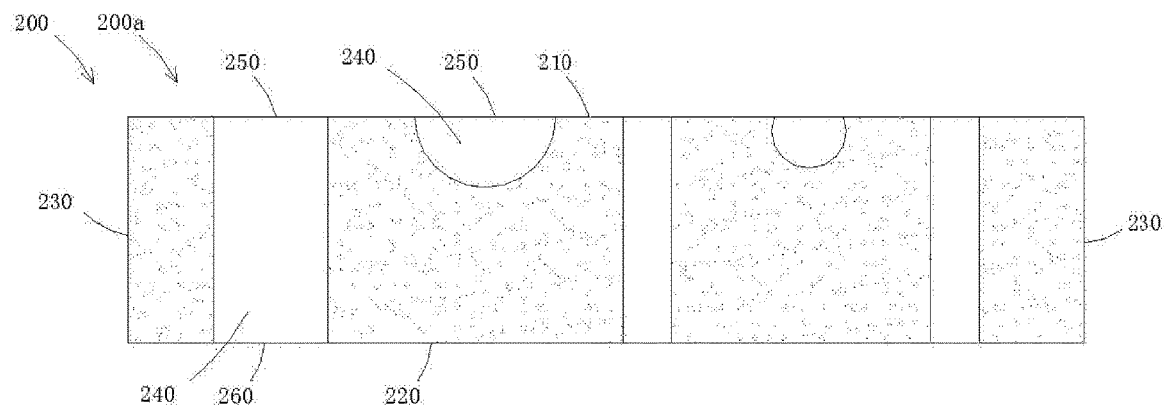
FIG. 5 is a sectional view of a third adhesion blocking element.

Referring to FIG. 5, in this case, some of the microstructures each have one cavity 240 formed in the main body 200a and one first open face 250 which is arranged on the first surface 210 of the main body 200a and communicated to the cavity 240, and the other microstructures each have one cavity 240 formed in the main body 200a, one first open face 250 which is arranged on the first surface 210 of the main body 200a and communicated to the cavity 240, and one second open face 260 which is arranged on the second surface 220 of the main body 200a and communicated to the cavity 240.

Figure 6:
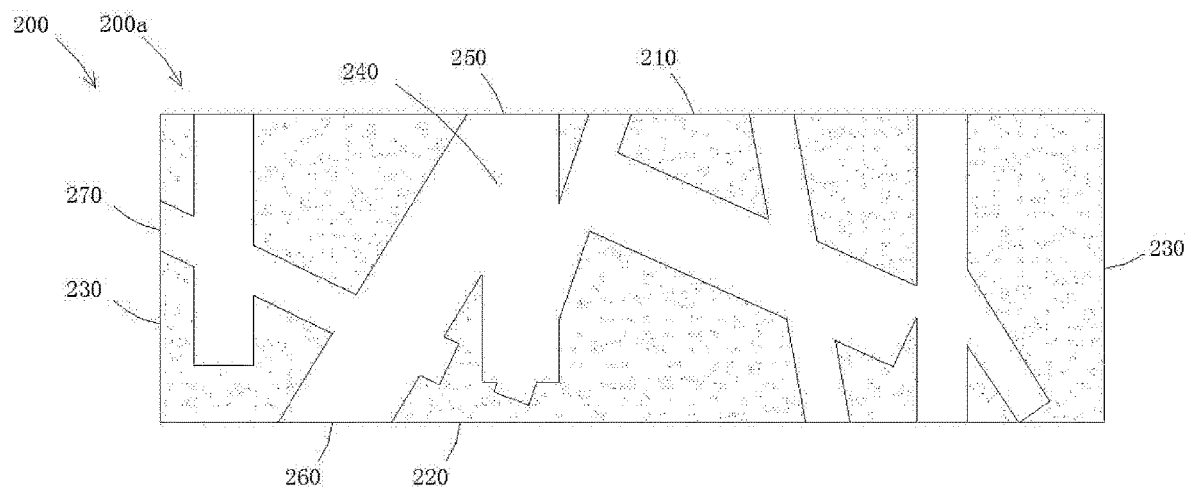
FIG. 6 is a sectional view of a fourth adhesion blocking element.

Referring to FIG. 6, in this case, each microstructure has one cavity 240 formed in the main body 200a and one first open face 250 which is arranged on the first surface 210 of the main body 200a and communicated to the cavity 240. The cavity 240 in some of the microstructures has a second open face 260 which is arranged on the second surface 220 of the main body 200a, and the cavity 240 in some of the microstructures has a third open face 270 which is arranged on one side face 230 of the main body 200a. The cavities 240 in all microstructures are communicated with each other. The third open face 270 in each microstructure may be the same or different in area. The third open face 270 in each microstructure may be in circular, square, polygonal or irregular shape. The third open face 270 may be arranged on any one side face 230 of the main body 200a, and may be arranged on multiple side faces 230 of the main body 200a.

The first open face 250 in some of the microstructures has an area of 0.1 $\mu m^2$, the first open face 250 in some other microstructures has an area of 50 $\mu m^2$, and the first open face 250 in the remaining microstructures has an area of 100 $\mu m^2$. Of course, the area of the first open face 250 in the microstructures may be defined according to actual requirements and fabrication process, as long as the area of the first open face 250 in the microstructures is in the range of 0.0001-100000 $\mu m^2$.

The rate of a sum of the areas of the first open faces 250 in all microstructures to the area of the first surface 210 of the main body 200a is 0.5. In other words, the first surface 210 of the main body 200a has a surface voidage of 0.5. Of course, the surface voidage of the first surface 210 of the main body 200a may be defined according to actual requirements and fabrication process, as long as the surface voidage of the first surface 210 of the main body 200a is in the range of 0.01-0.99.

The distribution density of the first open faces 250 of the microstructures on the first surface 210 of the main body 200a is $10^8/mm^2$. Of course, the distribution density of the first open faces 250 of the microstructures on the first surface 210 of the main body 200a may be defined according to actual requirements and fabrication process, as long as the distribution density of the first open faces 250 of the microstructures on the first surface 210 of the main body 200a is $10^4$-$10^{11}/mm^2$.

The rate of a sum of the volumes of the cavities 240 in all microstructures to the volume of the main body 200a is 0.75. In other words, the main body 200a has a volume voidage of 0.75. Of course, the volume voidage of the main body 200a may be defined according to actual requirements and fabrication process, as long as the volume voidage of the main body 200a is in the range of 0.01-0.99.

An average value of the spacings between the first open faces 250 in any two adjacent microstructures is less than 450 nm, so that the spacing between the first open faces 250 in all microstructures is small. In this way, the reflection and refraction of light rays when passing through the main body 200a from the second surface 220 to the first surface 210 of the main body 200a can be reduced.

The main body 200a has a flexural modulus of 60 Mpa, which makes the main body 200a be highly elastic. Of course, under the premise of meeting the requirement on the elasticity of the main body 200a, the flexural modulus of the main body 200a may be defined according to actual requirements and fabrication process, as long as the flexural modulus of the main body 200a is in the range of 10-500 Mpa.

Figure 12:
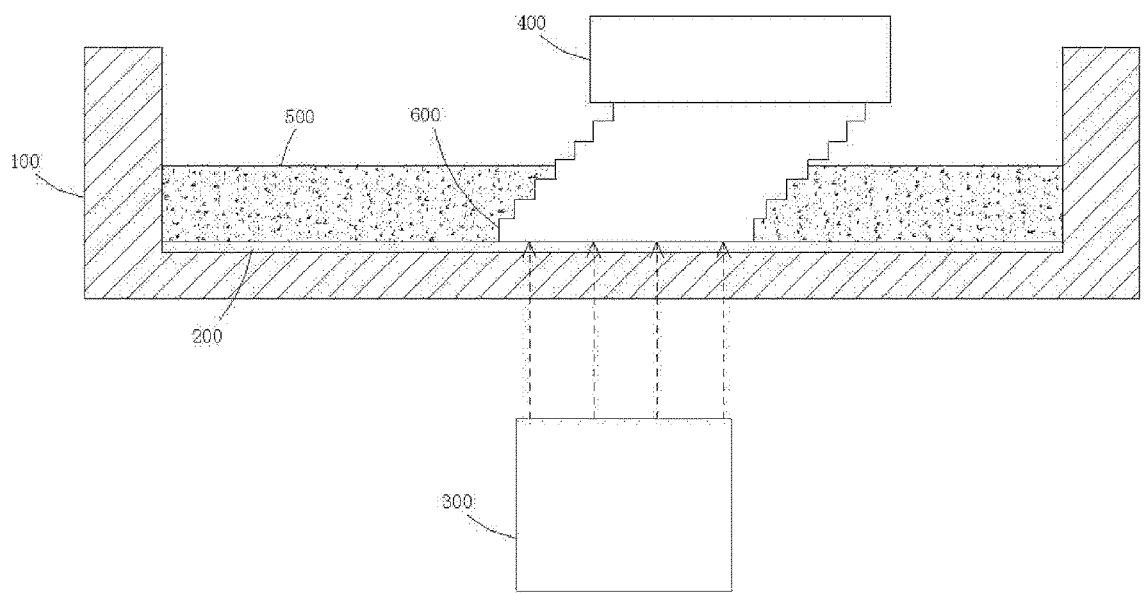

Referring to FIG. 1 and FIG. 12, this embodiment further provides a three-dimensional printing device, comprising one cartridge 100, one adhesion blocking element 200, one light source 300 and one carrier 400.

The cartridge 100 is used for holding a forming material in liquid form, and the bottom surface of the cartridge 100 is light-transmittable.

The second surface 220 of the adhesion blocking element 200 is arranged on the bottom surface of the cartridge 100, and the first surface 210 of the adhesion blocking element 200 is in contact with the forming material 500 in the cartridge 100.

The light source 300 is arranged below the cartridge 100. The light source 300 is used for irradiating the forming material 500 in contact with the first surface 210 of the adhesion blocking element 200. When irradiated, the forming material 500 is cured to form a cured layer 600 which is in contact with the first surface 210 of the adhesion blocking element 200.

Once formed, the cured layer 600 is attached to the carrier 400. The cured layer 600 can be driven to move when the carrier 400 moves. In this way, after driving, by the carrier 400, the cured layer 600 to move a certain distance in a direction away from the light source 300, the forming material 500 which is in contact with the first surface 210 of the adhesion blocking element 200 is irradiated by the light source 300, so that a cured layer 600 formed by curing the irradiated forming material 500 is attached to a previously formed cured layer 600.

The forming material 500 and the adhesion blocking element 200 do not infiltrate into each other. The contact angle between the forming material 500 and the first surface 210 of the adhesion blocking element 200 is denoted by θ'. The first surface 210 of the adhesion blocking element 200 has a plurality of first open faces 250, wherein the rate of a sum of the areas of all first open faces 250 to the area of the first surface 210 of the main body is denoted by φ, and the contact angle between the forming material 500 and the first surface 210 of the adhesion blocking element 200 having no first open face 250 is denoted by θ. The relationship between θ' and θ is determined by the following formula:

$$\cos\theta' = \varphi(\cos\theta + 1) - 1;$$

when the value of φ is less than 1, that is, due to the presence of the first open faces 250 in the microstructures, θ'>θ, the infiltration between the forming material 500 and the adhesion blocking element 200 is further decreased. It means that, after the forming material 500 is cured to form a cured layer 600, the adhesion between the cured layer 600 and the adhesion blocking element 200 is further decreased.

Referring to FIG. 3, an average value of the spacing L between the first open faces 250 in any two adjacent microstructures is less than the wavelength of light emitted by the light source 300. In this way, the reflection and refraction of light emitted by the light source 300 when passing through the adhesion blocking element 200 can be reduced. This maintains the irradiation intensity of the light source 300, thereby ensuring the quality and speed of three-dimensional printing.

Figure 7:
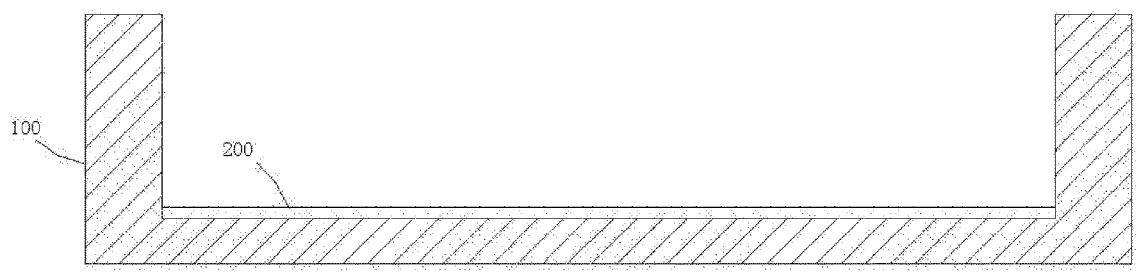
FIGS. 7-12 are structural diagrams of steps in a three-dimensional printing process.
Figure 8:
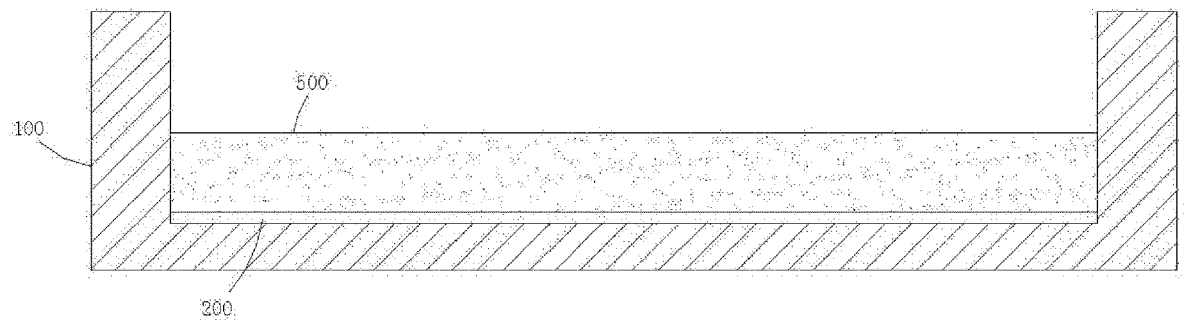
Figure 9:
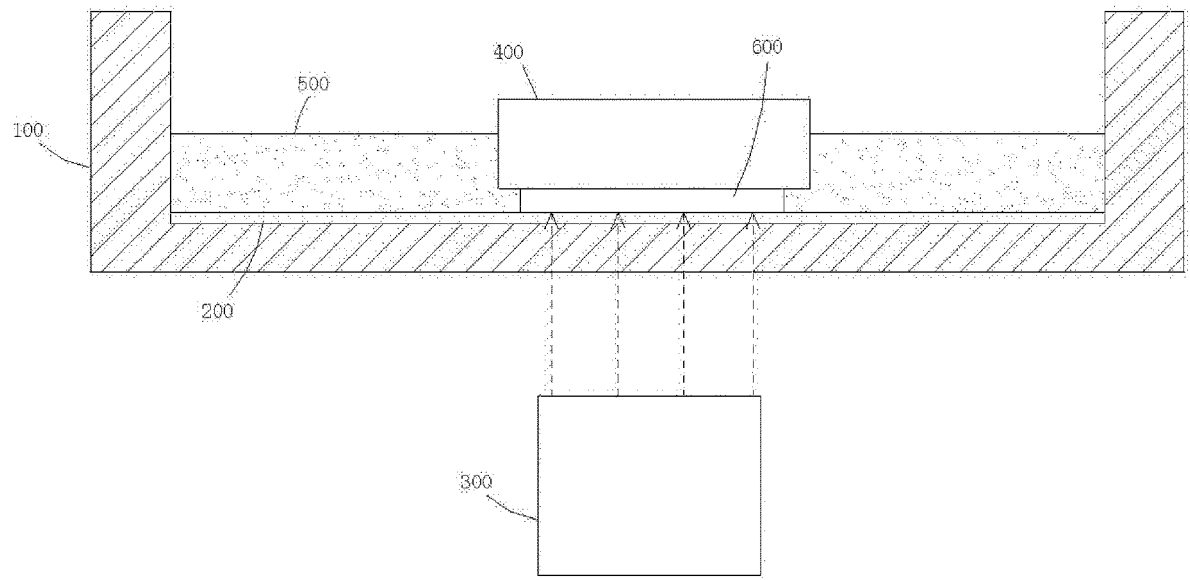
Figure 10:
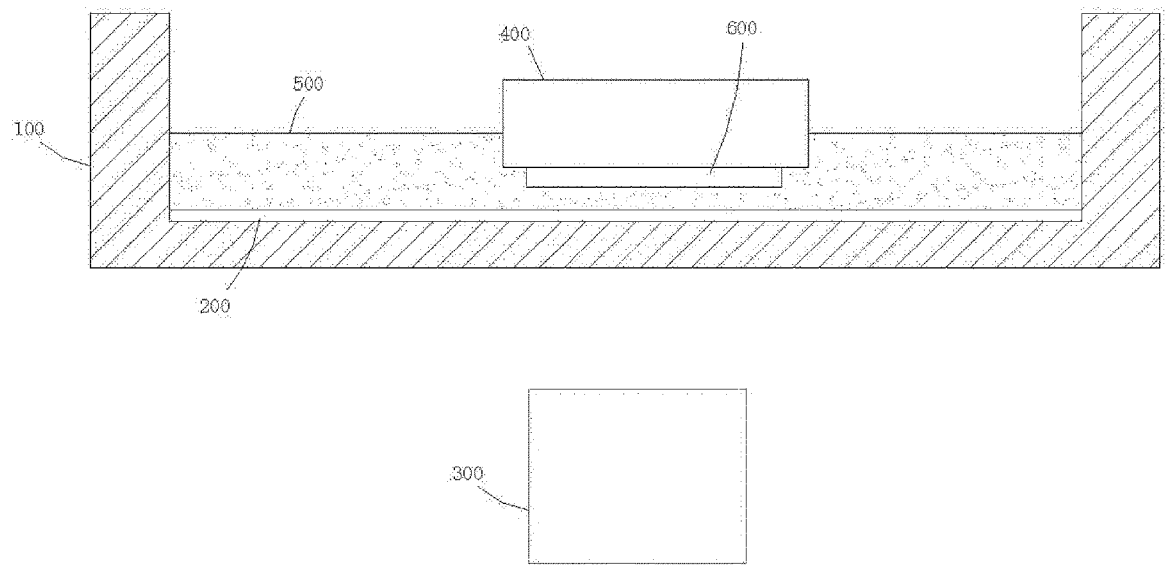
Figure 11:
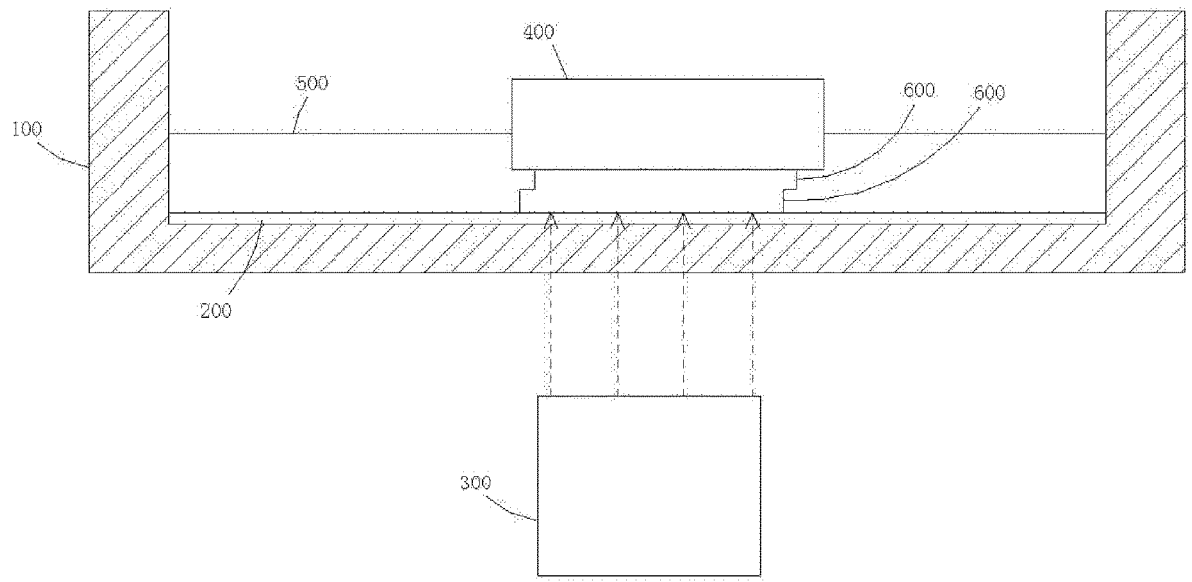

This embodiment further provides a three-dimensional printing method in which a three-dimensional object to be printed is divided into layers before printing and then printed layer-by-layer. The three-dimensional printing method specifically comprises:

a) referring to FIG. 7, placing the adhesion blocking element 200 on the bottom surface of the cartridge 100, wherein the second surface 220 of the adhesion blocking element 200 is attached to the bottom surface of the cartridge 100;

b) referring to FIG. 8, pouring, into the cartridge 100, the forming material 500 in the liquid form, wherein the forming material 500 is in contact with the first surface 210 of the adhesion blocking element 200;

c) referring to FIG. 9, moving the carrier 400 to a position at a certain distance from the first surface 210 of the adhesion blocking element 200, and irradiating, by the light source 300, the forming material 500 which is in contact with the first surface 210 of the adhesion blocking element 200, so that the irradiated forming material 500 is cured to form a cured layer 600 which is attached to the bottom of the carrier 400;

d) referring to FIG. 10, driving, by the carrier 400, the cured layer 600 to move in a direction away from the light source 300, wherein, during the movement of the cured layer 600, a portion of the first surface 210 of the adhesion blocking element 200, which is in contact with the cured layer 600, is pulled up to elastically deform, and the restoring force of such elastic deformation makes the adhesion blocking element 200 tend to separate from the cured layer 600, that is, the restoring force of such elastic deformation can facilitate the separation of the adhesion blocking element 200 from the cured layer 600, so that it is easier to peel the adhesion blocking element 200 off from the cured layer 600; and the cured layer 600 is separated from the first surface 210 of the adhesion blocking element 200 after the cured layer 600 is moved a certain distance, then the elastically deformed portion of the adhesion blocking element 200 is restored elastically, and the process of elastic restoration draws the forming material 500 towards the elastically restored portion of the adhesion blocking element 200, in this way, the flow rate of the forming material 500 into the gaps between the cured layer 600 and the adhesion blocking element 200 can be increased, so as to reduce the time consumption for filling the forming material 500 into the gaps between the cured layer 600 and the adhesion blocking element 200, thus to reduce the time consumption for three-dimensional printing;

e) referring to FIG. 11, irradiating, by the light source 300, the forming material 500 which is in contact with the first surface 210 of the adhesion blocking element 200, so that a cured layer 600 formed by curing the irradiated forming material 500 is attached to a previously formed cured layer 600 to form a unibody structure; and f) referring to FIG. 12, repeating the above steps c) to e), so that the cured layers 600 are stacked layer-by-layer; when the printing of all the cured layers 600 is completed, the three-dimensional object to be printed is formed.

The adhesion blocking element 200 is made of one or more of polytetrafluoroethylene, poly(4-methyl-1-pentene) and polydimethylsiloxane.

The adhesion blocking element 200 may be made of one or more of Parylene, polyperfluorinated ethylene propylene, ethylene-chlorotrifluoroethylene copolymer, polyvinylidene fluoride, ethylene-tetrafluoroethylene copolymer, tetrafluoroethylene-vinylidene fluoride copolymer, chlorotrifluoroethylene-vinylidene fluoride copolymer, o-phenylphenol, polyphenyl ether, polyterephthalic acid and polystyrene, wherein Parylene comprises Parylene C, Parylene N, Parylene D, Parylene HT and Parylene AF.

Of course, the adhesion blocking element 200 may also be made of one or more of polytrifluorochloroethylene, polytetrafluoroethylene, polyvinylidene fluoride, poly(vinylfluoride), polytrichloroethylene, perfluoroalkyl polyether, hexafluoropropylene, fluorinated poly(vinyl chloride), poly(4-methyl-1-pentene) and polydimethylsiloxane.

During the fabrication of the adhesion blocking element 200, first, the aforementioned materials forming the adhesion blocking element 200 are mixed in different proportions, and then treated by a foaming process to form a porous stereo-structure. The adhesion blocking element 200 may be a stereo-structure having a plurality of cavities 240 therein. The cavities 240 form first open faces 250 on the first surface 210 of the adhesion blocking element 200. Or, during the fabrication of the adhesion blocking element 200, first, the aforementioned materials forming the adhesion blocking element 200 are mixed in different proportions and then treated by an extruding process to form a film, and then the surface of the film is spot-melted by laser or etched in order to generate voids on the surface of the film.

Specifically, the process of fabricating the adhesion blocking element 200 may be as described in the following five examples.

Example 1

By magnetron sputtering, Cu with a thickness of 10 nm was deposited on a clean polytetrafluoroethylene (PTFE) surface having a thickness of 50 μm, which was specifically conducted by a Discovery 635 multi-target magnetron sputtering coating machine, in a DC sputtering mode, at a sputtering power of 100 W, in the presence of argon having a flow rate of 40 SCCM, with a sputtering time of 1 min. The sputtered PTFE film surface was treated by inductively coupled plasma etching, the flow rates of argon, oxygen and carbon tetrafluoride were adjusted to be 15, 10 and 30 SCCM, respectively, and the pressure was 1-2 Pa. The power of the power supply for generating plasma was 400 W, the power of the power supply for accelerating plasma in the inductively coupled cavity was 100 W, and the etching time was 15 s. Depressions were formed, which have open faces each having an area of 0.0001 μm$^2$.

Example 2

By magnetron sputtering, Cu with a thickness of 5 nm was deposited on a clean polytetrafluoroethylene (PTFE) surface having a thickness of 50 μm, which was specifically conducted by a Discovery 635 multi-target magnetron sputtering coating machine, in a DC sputtering mode, at a sputtering power of 100 W, in the presence of argon having a flow rate of 40 SCCM, with a sputtering time of 1 min. The sputtered PTFE film surface was treated by inductively coupled plasma etching, the flow rates of argon, oxygen and carbon tetrafluoride were adjusted to be 15, 10 and 30 SCCM, respectively, and the pressure was 1-2 Pa. The power of the power supply for generating plasma was 400 W, the power of the power supply for accelerating plasma in the inductively coupled cavity was 100 W, and the etching time was 30 s. Depressions were formed, which have open faces each having an area of 0.01 μm$^2$.

Example 3

Polyvinylidene fluoride (PVDF) was dissolved in a mixed solution of N,N-dimethylformamide (DMF) and acetone (3:2), and heated under magnetic stirring in a water bath at 60° C. to prepare a PVDF solution at a concentration of 20%. The PVDF solution was added into a volumetric syringe with a stainless steel needle #27, and the syringe was fixed on an electrospinning actuating device. The pushing speed of the syringe was 2 mL/h. The distance from the spinning needle to the collection drum was about 15 cm. The spinning needle was connected to the positive voltage terminal and the collection drum was connected to the negative voltage terminal. The drum was coated with aluminum foil which serves as a substrate for collecting the spinning fiber. When there was PVDF solution extruded from the needle, the negative voltage was adjusted to be −2 KV and the positive voltage was adjusted to be 15 KV. The PVDF solution was electrospun at room temperature. The rotation speed of the collection drum was about 50 RPM, and the spinning lasted for 2-3 hours. The spun film was stripped off from the aluminum foil to obtain a PVDF nanofiber film. The nanofibers were disorderly interwoven to form a depressed porous structure. The depressions had open faces each having an area of 0.1-1 μm$^2$.

Example 4

The main body of polydimethylsiloxane and the curing agent were mixed in a ratio of 10:1 by mass, and salt particles having a diameter of 10 μm were added. In the mixture, the proportion of the inorganic salt was 30% by mass. After uniformly mixed, the mixture was de-foamed. The mixture in the liquid form was spin-coated onto the surface of the glass substrate at a speed of 1000 RPM and a coating time of 2 min. The spin-coated film was heated at 80° C. for 5 h, such that it is cured. After cured, the film was immersed in water for 48 h. Then, all the salt particles were dissolved out and depressions were formed on the surface. The depressions had open faces each having an area of 100 μm$^2$.

Example 5

A photoresist mask was prepared on a wafer surface by photolithography. The pattern of the mask was an array of square windows and each square was 100 μm long on each side. The wafer surface exposed from the windows was etched by inductively coupled plasma etching, the flow rates of argon, oxygen and sulfur hexafluoride were adjusted to be 200, 10 and 35 SCCM, respectively, and the pressure was 2 Pa. The power of the power supply for generating plasma was 800 W, the power of the power supply for accelerating plasma in the inductively coupled cavity was 50 W, and the etching time was 300 s. By using the etched wafer as a mask, the polytetrafluoroethylene (PTFE) film surface was stamped by a hot stamping device, at a pressure of 2 MPa and a rate of temperature increase of 6° C./min (with the highest temperature of 237° C.). When the highest temperature was reached, it was maintained for 2 min. After cooling, depressions were formed on the PTFE film surface. The depressions had open faces each having an area of 10000 μm$^2$.

The examples of the present invention with better application have been described above only for illustration and should not be interpreted as limitations to the claims. The structure of the present invention may vary and is not limited to the structures mentioned above. In short, any variations made within the protection scope of the independent claims of the present invention shall be included within the protection scope of the present invention.

In addition, the three-dimensional printing device mentioned in the present invention is also called a photocuring three-dimensional manufacturing device, wherein the curable material 5 mentioned in the present invention is also called a polymerizable material.

Figure 13:
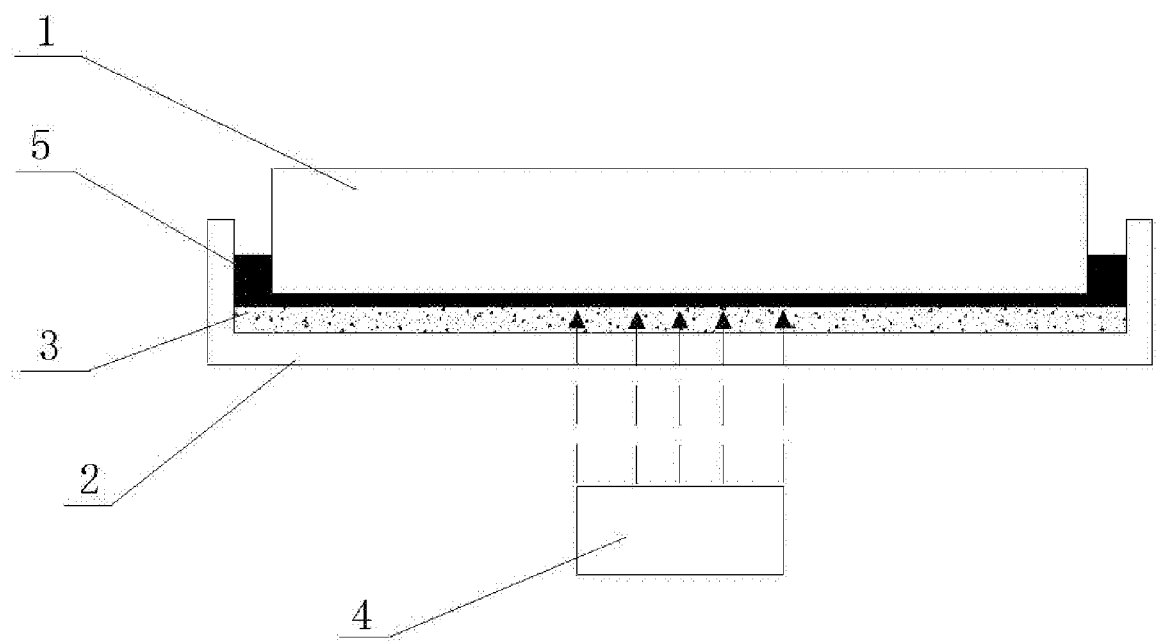
FIG. 13 is a structural diagram of the present invention.
Figure 14:
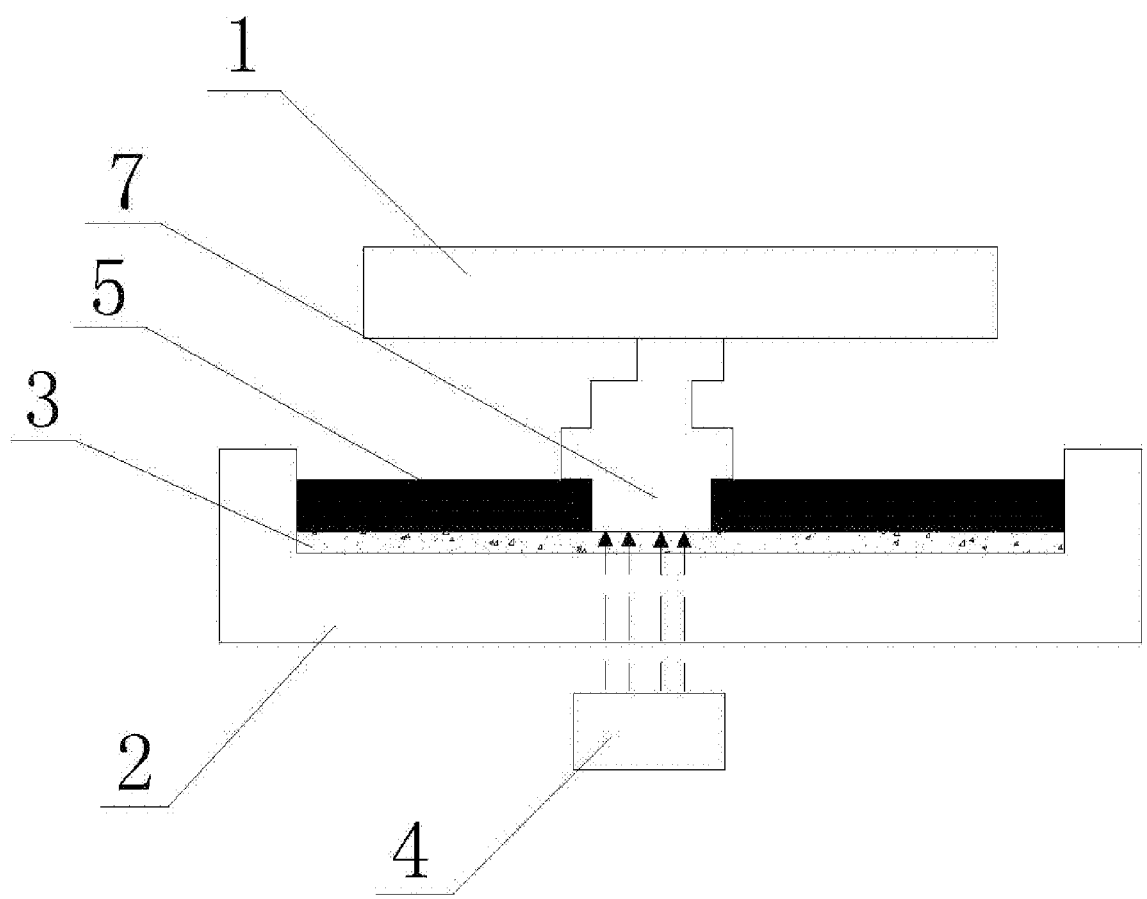
FIG. 14 is a structural diagram of the present invention when in use.

As shown in FIGS. 13-14, a photocuring three-dimensional manufacturing device comprises: a carrier 1 used for carrying and moving a three-dimensional construct 7, wherein the carrier 1 is connected to a mechanical driving device that drives the carrier 1 and the three-dimensional construct 7 to move in the vertical direction; a construction platform arranged below the carrier 1, wherein a light-transmittable cartridge 2 for holding a curable material 5 is arranged on the construction platform, and the curable material 5 is in the liquid form; and a light source 4 arranged below the construction platform, which is used for irradiating the construction platform and providing UV light in a range of wavelength that can be used to cure the curable material 5. The light source 4 passes through the construction platform and the cartridge 2 and irradiates the curable material 5 in the cartridge 2. The curable material 5 is cured in the cartridge 2 to form a part of the three-dimensional construct 7. Then, this part of the three-dimensional construct 7 is pulled up, by the carrier 1, away from the bottom surface of the cartridge 2. Again, the curable material 5 flowing back to the bottom surface of the cartridge 2 is irradiated by the light source 4 and then cured. In a similar way, the printing is carried out layer-by-layer to form a complete three-dimensional construct 7. Since both the three-dimensional construct 7 and the cartridge 2 are in the solid state, the contact surface between them is in solid-solid contact, leading to great surface adhesion between them. As direct separation will cause certain mechanical damage to both the bottom of the cartridge 2 and the three-dimensional construct 7, a release layer 3 is additionally provided between the bottom of the cartridge 2 and the curable material 5. The release layer 3 is overall in the liquid form, and in contact with but immiscible with the curable material 5, and has a density greater than that of the curable material 5. During the operation of the photocuring three-dimensional manufacturing device of the present invention, first, the release layer 3 in the liquid form is added into the cartridge 2 and then the curable material 5 is added into the cartridge 2. The mixture is kept standing until the release layer 3 in the liquid form and the curable material 5 in the cartridge 2 are distinctly divided into two layers, so that the curable material 5 is isolated from the bottom of the cartridge 2 by the release layer 3 in the liquid form. After irradiating the curable material 5 by the light source 4, the curable material 5 in the irradiation range of the light source 4 is cured on the surface of the release layer 3 to form a part of the three-dimensional construct 7. The three-dimensional construct 7 is pulled up, by the carrier 1, away from the surface of the release layer 3. In this case, the contact surface between the three-dimensional construct 7 and the release layer 3 is in solid-liquid contact, and the surface adhesion between them is less than the surface adhesion in the case of solid-solid contact. Therefore, the three-dimensional construct 7 can be directly pulled up and thus separated from the release layer 3, and when the three-dimensional construct 7 is pulled up, no mechanical damage will be caused to the three-dimensional construct 7 and the cartridge 2. Meanwhile, it is convenient for the quick separation of the three-dimensional construct 7 from the release layer 3, and the efficiency of three-dimensional fabrication is improved. Furthermore, the release layer 3, as a stable separation medium, will have no influence on the forming effect of the three-dimensional construct 7, and the stability of three-dimensional fabrication is ensured.

The following possibility will be discussed. When the three-dimensional construct 7 is pulled up, by the carrier 1, away from the release layer 3, due to the presence of the vacuum between the release layer 3 and the curable material 5, part of liquid in the release layer 3 is pulled up at atmospheric pressure so that the surface of the release layer 3 becomes uneven. Since the surface of the release layer 3 is the bottom surface of a region where curing occurs, the uneven surface of the release layer 3 will influence the structure of the three-dimensional construct 7 and thus the overall effect of three-dimensional printing. In order to avoid this possibility, the following methods may be employed.

Figure 15:
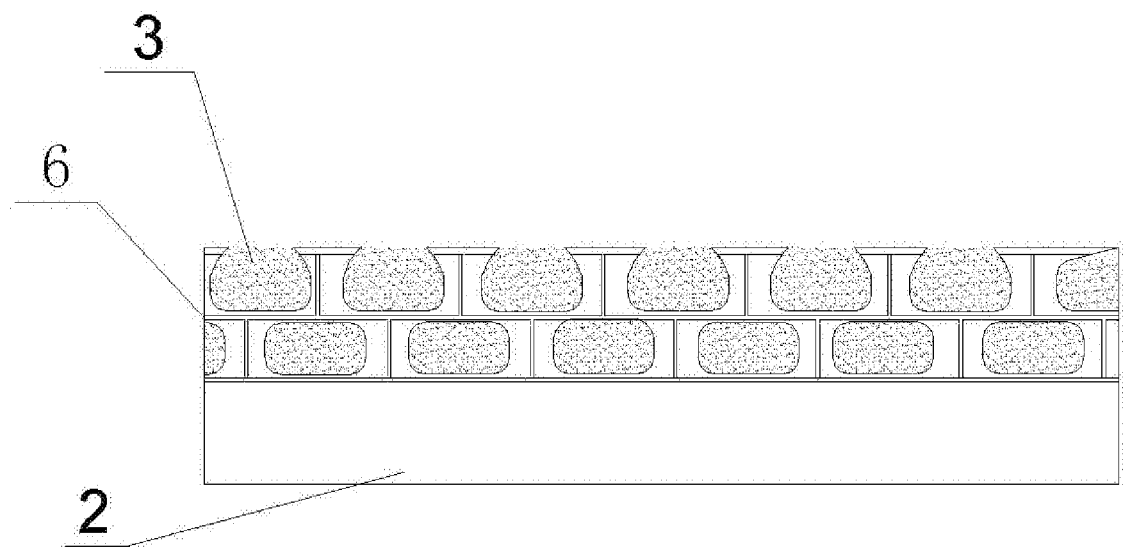
FIG. 15 is a diagram showing the sectional structure between the release layer and the securing member according to a first method of the present invention.

In a first method, a securing member 6 is arranged between the release layer 3 and the bottom of the cartridge 2, to secure the release layer 3. The securing member 6 internally has a cavity structure communicated with the outside, wherein the release layer 3 is secured in the cavity of the securing member 6, that is, the release layer 3 in the liquid form is filled into the cavity of the securing member 6 to form a stable structure as a whole. The securing member 6 is preferably gel or nanofiber, wherein the gel has a three-dimensional network structure into which the release layer 3 in the liquid form can enter, in order to stabilize the release layer 3; the nanofiber has an average diameter of 30-80 nm, and the release layer 3 in the liquid form can enter into the nanofiber, so as to stabilize the release layer 3. The material of gel or nanofiber may be selected from hydrophilic polymer material, including nylon, polyurethane, polyvinyl alcohol, etc. In addition, in order to enhance the adhesion between the securing member 6 and the bottom of the cartridge 2, the bottom of the cartridge 2 may be processed to be frosted. The frosted degree should not influence the irradiation precision of the light source, as shown in FIG. 15.

In a second method, a securing member 6 in the solid form is arranged in the release layer 3, to secure the release layer 3. The securing member 6 is formed by polymerization of any one of, or copolymerization of more of, polytrifluorochloroethylene, polytetrafluoroethylene, polyvinylidene fluoride, poly(vinylfluoride), polytrichloroethylene, perfluoroalkyl polyether, hexafluoropropylene and fluorinated poly(vinyl chloride). The surface adhesion generated when the securing member 6 is contacted with the three-dimensional construct 7 can be decreased.

Preferably, the securing member 6 is flaky or platy or blocky. The securing member 6 is detachably or fixedly connected to the cartridge 2. Preferably, the securing member 6 is detachably connected to the cartridge 2, so that it is convenient for cleaning and replacement and this is also useful for fixing the mounting position of the securing member 6 in order to avoid the free motion of the securing member 6 with the vibration of the release layer 3 which may influence the stability. The detachable connection may be clamping, or fastening, etc.

Figure 16:
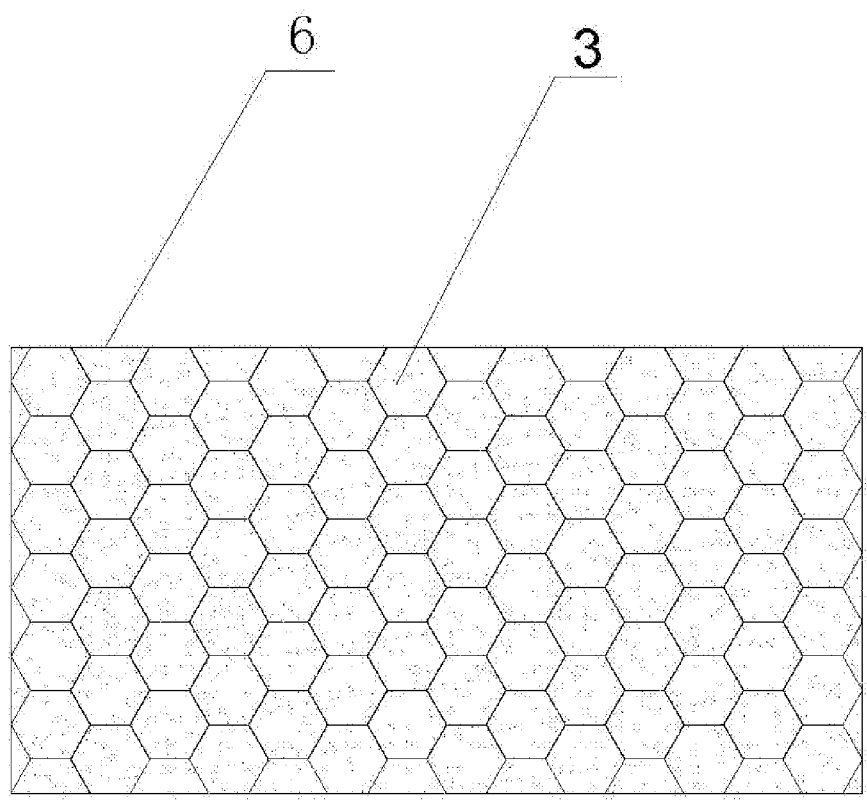
FIG. 16 is a top view showing the coordination between the securing member and the release layer in a first example according to a second method of the present invention.
Figure 17:
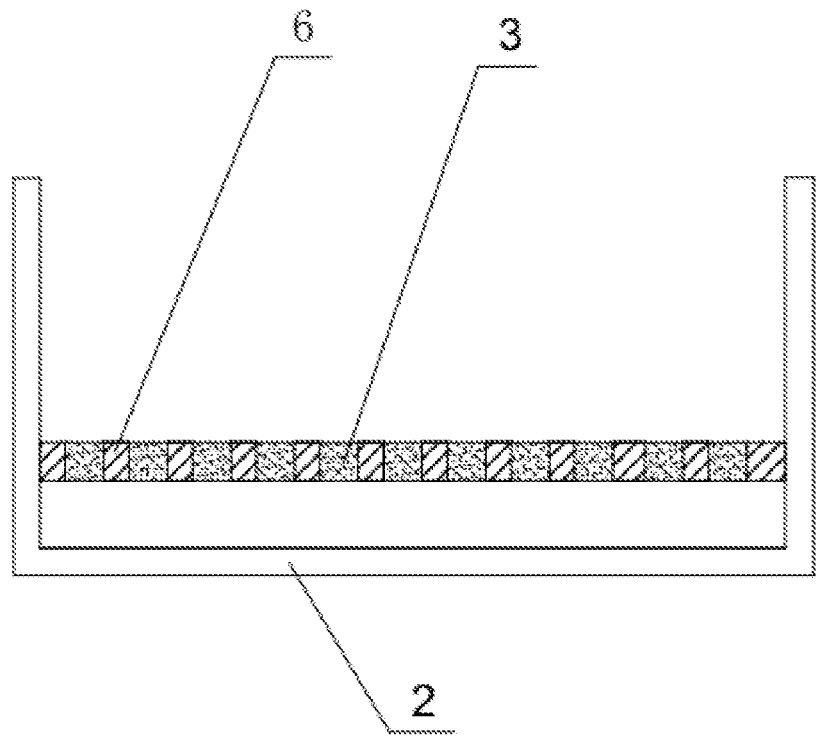
FIG. 17 is a sectional view showing the coordination between the securing member and the release layer in a second example according to the second method of the present invention.

As shown in FIGS. 16-17, the securing member 6 has one upper surface that is flush with the upper surface of the release layer 3. The securing member 6 has a plurality of cavities, the upper surface of the securing member 6 has a plurality of open faces communicated with the cavities, and the release layer 3 enters the cavities to form a solid-liquid interface on the upper surface of the securing member 6. That is, when the upper surface of the securing member 6 is kept flush with the upper surface of the release layer 3, part of the release layer 3 in the liquid form can be filled into the cavities of the securing member 6 so that the open faces on the upper surface of the securing member 6 are full of the release layer 3. In this way, a solid-liquid interface is formed on the upper surface of the securing member 6. The surface adhesion between this solid-liquid interface and the three-dimensional construct 7 is less than the surface adhesion as in the solid-solid contact in the prior art. It is convenient for releasing and also can stabilize the release layer 3 to avoid leading to an uneven surface of the release layer 3 which may influence the overall effect of three-dimensional printing. It is to be further noted that, when the securing member 6 is flaky, it has a plurality of cavities and the upper surface of the securing member 6 has a plurality of open faces communicated with the cavities. This structure also includes a network structure.

Figure 18:
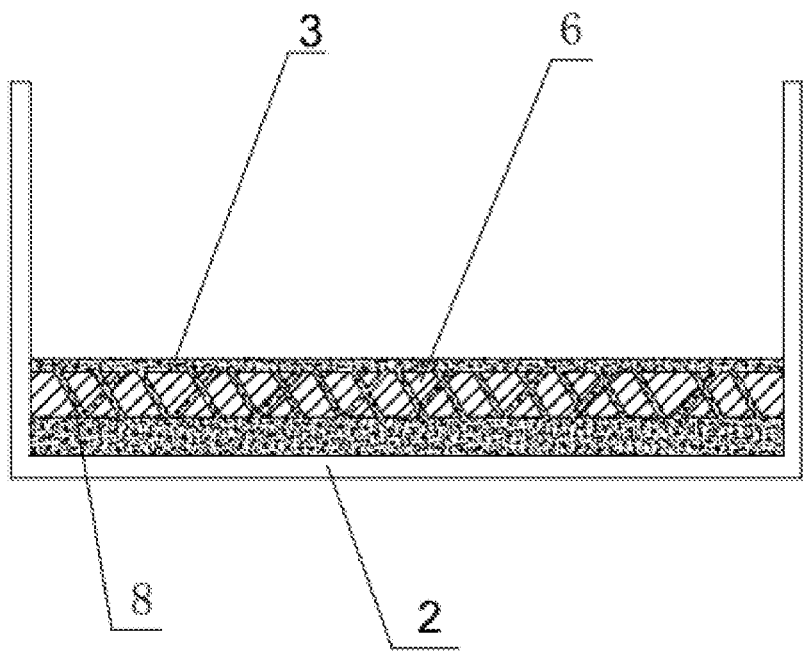
FIG. 18 is a sectional view showing the coordination between the securing member and the release layer in a third example according to the second method of the present invention.

As shown in FIG. 18, the securing member 6 is immersed in the release layer 3, the securing member 6 has one upper surface in parallel with the release layer 3, and the distance from the upper surface of the securing member 6 to the upper surface of the release layer 3 is greater than 0 and less than ½ of the depth of the release layer 3. The thickness of the securing member 6 is less than ¼ of the depth of the release layer 3. The outer surfaces of the securing member 6 are all rough surfaces, which may achieve the effect of stabilizing by friction when the release layer 3 in the liquid form vibrates. A plurality of channels 8 provided for the passage of the release layer 3, are alternatively arranged in the securing member 6, and both ends of each of the channels 8 run to the corresponding upper and lower surfaces of the securing member 6. This can stabilize the release layer 3 in the liquid form, to avoid leading to an uneven surface of the release layer 3 which may influence the overall effect of three-dimensional printing.

Preferably, the securing member 6 is a sphere or cone or cylinder, and there are at least two securing members 6.

Figure 19:
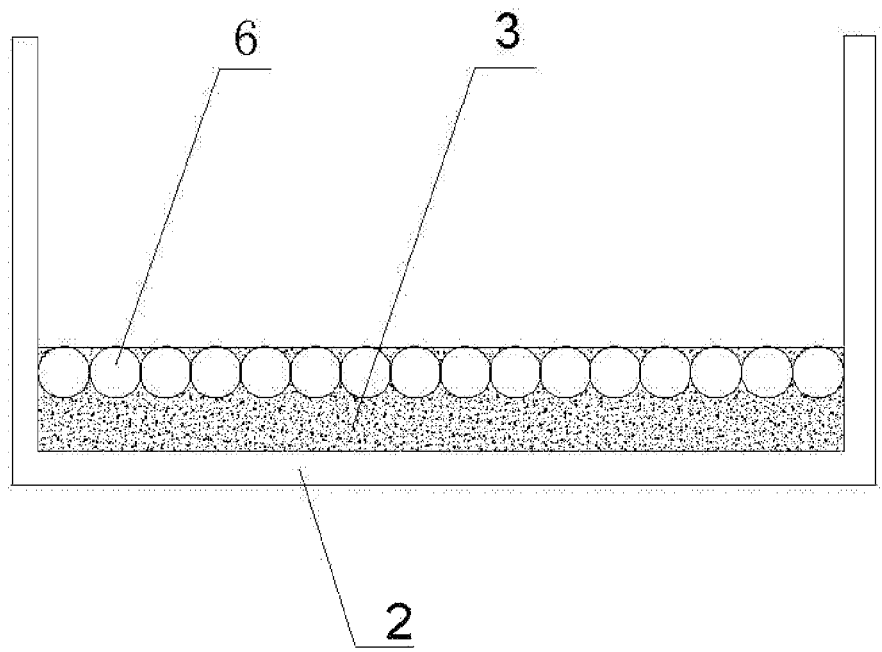
FIG. 19 is a sectional view showing the coordination between the securing member and the release layer in a fourth example according to the second method of the present invention.
Figure 20:
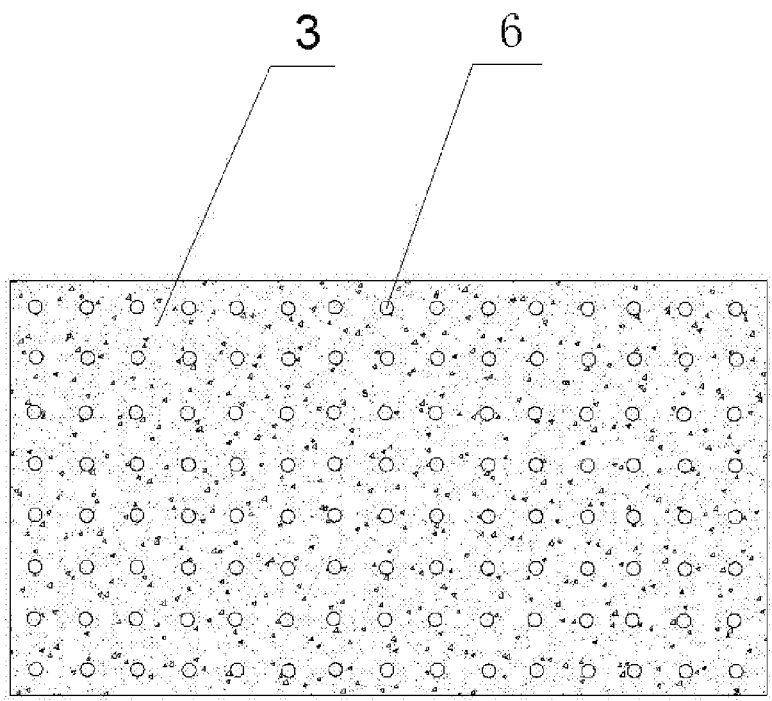
FIG. 20 is a top view of FIG. 19.

As shown in FIGS. 19-20, the highest point of the securing member 6 is flush with the upper surface of the release layer 3 to form a solid-liquid interface, that is, the securing member 6 floats on the upper surface of the release layer 3 to form a solid-liquid interface. In other words, a plurality of points are formed on the upper surface of the release layer 3, and the points and the upper surface of the release layer 3 together form a solid-liquid interface having solids scattered in the liquid. In addition to ensuring the decrease in the surface adhesion between the release layer 3 and the three-dimensional construct 7, this can stabilize the release layer 3 in the liquid form, to avoid leading to an uneven surface of the release layer 3 which may influence the overall effect of three-dimensional printing. In addition, the adjacent securing members 6 may be adhered to each other to form one stable structure which is then fixed to the cartridge 2, in order to avoid the free motion of the securing member 6, which may influence the effect of printing.

Figure 21:
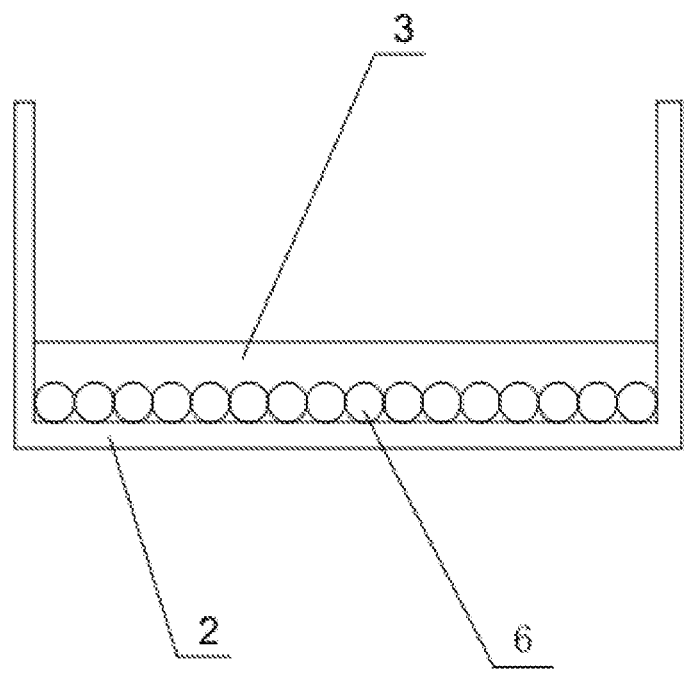
FIG. 21 is a sectional view showing the coordination between the securing member and the release layer in a fifth example according to the second method of the present invention.

As shown in FIG. 21, the securing member 6 is immersed in the release layer 3 and arrange at the bottom of the cartridge 2, to stabilize the release layer 3 in the liquid form.

In addition, in order to further improve the stability of the release layer 3, the density of the release layer 3 may be increased. Preferably, the release layer 3 is water or a light-transmittable aqueous solution. During the practical operations, since the curable material commonly used in the field of photocuring three-dimensional fabrication is photosensitive resin that has a density less than that of water and is insoluble in water, water or a light-transmittable aqueous solution is used as the release layer 3, which is environmentally-friendly and achieves the stability of the release layer 3. Preferably, the light-transmittable aqueous solution is an inorganic salt solution. The inorganic salt solution is any one of soluble alkali metal salt solution, ammonium salt solution, nitrate solution, perchlorate solution, permanganate solution, sulfate solution, selenate solution, chloride solution, bromide solution and iodide solution. The soluble alkali metal salt solution, ammonium salt solution, nitrate solution, perchlorate solution, permanganate solution, sulfate solution, selenate solution, chloride solution, bromide solution and iodide solution are all saturated solution. Preferably, the inorganic salt solution may be saturated sodium chloride solution, calcium chloride solution, magnesium chloride solution, sodium sulfate solution, sodium carbonate solution, sodium acetate solution, sodium nitrate solution, sodium bromide solution, potassium bromide solution, calcium bromide solution, magnesium bromide solution, copper sulfate solution, zinc sulfate solution, copper chloride solution, zinc chloride solution or the like, which is low in cost and safe in temperature.

In order to further increase the density of the release layer, the light-transmittable aqueous solution is preferably water-soluble organic salt weighting agent solution. The water-soluble organic salt weighting agent solution is any one of organic acid alkali metal salt solution, organic acid ammonium salt solution, organic acid tertiary ammonium salt solution and organic acid quaternary ammonium salt solution. Preferably, the organic acid alkali metal salt solution, organic acid ammonium salt solution, organic acid tertiary ammonium salt solution and organic acid quaternary ammonium salt solution are all saturated solution.

Finally, it is to be noted that the above embodiments are provided merely for describing the technical solutions of the invention, rather than limiting the invention. Although the invention has been described in details by the above embodiments, it should be understood by a person of ordinary skill in the art that modifications may be made to the technical solutions mentioned in the above embodiments, or equivalent replacements may be made to a part of the technical features, however, these modifications or replacements cannot make the essence of the corresponding technical solutions depart from the spirit and scope of the technical solutions of the embodiments in the invention.

What is claimed is:

1. A 3D printer comprising:
 a liquid storage tank configured to hold a polymerization liquid; and
 an anti-sticking element arranged on a bottom of the liquid storage tank, the anti-sticking element comprising:
  a top surface in contact with the polymerization liquid, and
  a plurality of microstructure depressions that extend from openings on the top surface away from the polymerization liquid, wherein at least some of the plurality of microstructure depressions contain air and have a first opening arranged on the top surface, but has no second openings arranged on a bottom surface of the anti-sticking element;
 wherein the anti-sticking element prevents the three-dimensional part from sticking to the bottom of the liquid storage tank.

2. The 3D printer of claim 1, wherein at least two of the plurality of microstructure depressions of the anti-sticking element are connected.

3. The 3D printer of claim 1, wherein the bottom surface of the anti-sticking element is in contact with the liquid storage tank.

4. The 3D printer of claim 1, wherein the opening of at least one of the plurality of microstructure depressions has an area in a range from 0.0001 $\mu m^2$ to 10000 $\mu m^2$.

5. The 3D printer of claim 1, wherein a ratio of an area of the opening of at least one of the plurality of microstructure depressions to an area of the top surface of the anti-sticking element is in a range from 0.01 to 0.99.

6. The 3D printer of claim 1, wherein a density of the openings of the plurality of microstructure depressions on the top surface of the anti-sticking element is in a range from $10^4$ to $10^{11}$ per $mm^2$.

7. The 3D printer of claim 1, wherein the anti-sticking element has a flexural modulus in a range from 10 to 500 MPa.

8. The 3D printer of claim 1, wherein the anti-sticking element is light transmittable.

9. The 3D printer of claim 1, wherein the anti-sticking element is made of a polymer material.

* * * * *